May 31, 1960 D. H. POLZIN 2,938,652
FERTILIZER DISTRIBUTOR
Filed Oct. 30, 1958
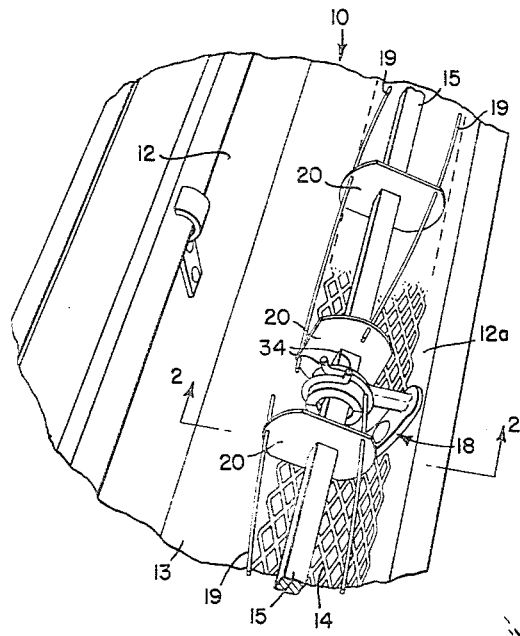
FIG. 1
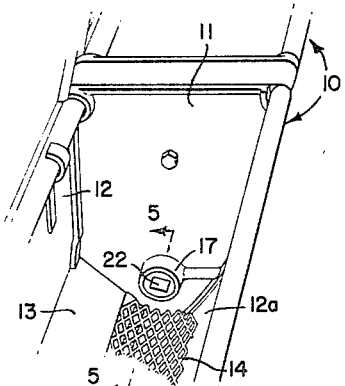
FIG. 4
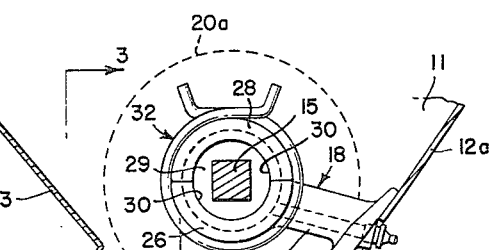
FIG. 2
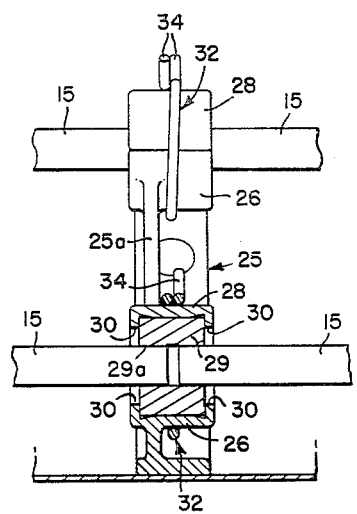
FIG. 3
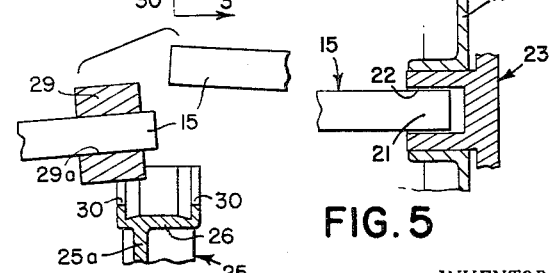
FIG. 6
FIG. 5
INVENTOR.
DONALD H. POLZIN
BY
C. T. Parker R. C. Johnson
ATTORNEYS United States Patent Office 2,938,652
Patented May 31, 1960

2,938,652
FERTILIZER DISTRIBUTOR

Donald H. Polzin, Horicon, Wis., assignor to Deere & Company, Moline, Ill., a corporation of Delaware Filed Oct. 30, 1958, Ser. No. 770,795

3 Claims. (Cl. 222—410)

The present invention relates generally to agricultural implements and more particularly to material dispensing machines, such as fertilizer distributors and the like.

The object and general nature of the present invention is a provision of a new and improved bearing construction for the feed shafts and/or drive shafts of such implements as fertilizer distributors, wherein the bearing includes readily detachable parts so constructed and arranged that the shafts may readily be removed from the inside of the hopper easily and conveniently, thereby facilitating cleaning out the hopper as at the end of the day's operation.

More specifically, it is a feature of this invention to provide a bearing arrangement wherein the bearing encloses separable parts that are normally held in shaft-receiving relation by a bearing-encircling spring member, so constructed and arranged as to exert a continual bias holding the bearing parts together but having means whereby the spring member may be expanded circumferentially to disconnect the bearing parts, so that one may be shifted axially away from the other to release the associated shaft or shafts to thereby permit the latter to be simply lifted out of the associated hopper without requiring the dismantling of any other bearing parts or the removal of the shaft axially through an opening in the end of the housing.

These and other objects and advantages of the present invention will be apparent to those skilled in the art after a consideration of the following detailed description of the preferred structure embodiment in which the principles of the present invention have been incorporated.

In the accompanying drawings:

Fig. 1 is a fragmentary top perspective view of a fertilizer hopper in which the principles of the present invention have been incorporated.

Fig. 2 is a sectional view taken generally along the line 2—2 of Fig. 1.

Fig. 3 is a sectional view taken generally along the line 3—3 of Fig. 1, certain parts being omitted.

Fig. 4 is a fragmentary view of an end portion of the hopper.

Fig. 5 is a fragmentary sectional view taken along the line 5—5 of Fig. 4.

Fig. 6 is a fragmentary view illustrating the disassembly of the shafts.

The fertilizer distributor in which the principles of this invention have been incorporated embodies a pair of axially aligned hoppers 10, each having a laterally inner end wall or box end 11, a laterally outer end wall or box end (not shown), and front and rear side walls 12 and 12a. Suitable drive means (not shown) is disposed between the box ends 11 (Fig. 4) and these end members 11 are apertured to provide for the extension of associated shaft ends therethrough for releasable driving connection to said drive means, as will be described below in more detail. Rotatable in the lower portion of each hopper 10 above a baffle, made up of an imperforate sheet 13 and a reticulated portion 14, is an upper pair of axially aligned agitator shafts 15. One end of one shaft of each pair is supported for rotation by suitable bearing means 17 in the associated end wall 11 (Fig. 4), this end of the shaft being connectible with the above mentioned drive means and is therefore referred to hereafter as the "drive end" of the shaft. The inner or adjacent ends of the agitator shafts 15 of each pair are supported for rotation in a center bearing means 18 (Fig. 1). Each of the agitator shafts 15 supports fertilizer agitating means in the form of spiral members 19 carried by disks 20 connected in any suitable way to rotate with the associated shafts 15. The path of movement of the agitators is indicated at 20a in Fig. 2.

The drive end of the inner shaft 15 is supported on the associated box end 11 and, as shown in Fig. 5, includes a squared portion 21 that is adapted to enter the corresponding square opening 22 in a socketed driving bushing 23 that is mounted for rotation in the associated hopper end 11 and forms a part of the bearing means 17. The member 23 is driven by any suitable conventional drive means, not shown. The fit of the square shaft end 21 in the driving socket member 23 is sufficiently loose to accommodate some vertical movement of the opposite end of the shaft 15 when installing and removing the latter, as will be described in detail below.

The present invention is primarily concerned with the particular center bearing construction 18, which will now be described. As will be seen from Figs. 2 and 3, the hoppers 10 carry two sets of shafts 15, one pair constituting fertilizer agitator shafts above the baffle sections 13 and 14 and the other pair constituting fertilizer feed shafts below the baffle. The upper and lower shafts and their center supports are substantially identical. The lower pair of shafts 15 carry feed wheels, the position of which is indicated at 15a in Fig. 2.

The center bearing means 18 includes a supporting member 25 that is fixed in any suitable way to the lower portion of the hopper and at its upper end includes a bearing half 26 that extends axially from the main body of the supporting member 25. An upper or complementary bearing half in the form of a bearing cap 28 is constructed and arranged to rest on the lower bearing half 26 and to complete the bearing means that, as shown in Figs. 1 and 3, receives the inner or adjacent ends of the two shafts 15 associated therewith. These two shaft ends, which are square in cross section, are received by a journal box 29 which has a square socket 29a to non-rotatably receive the associated shaft ends. Thus, one shaft 15 is driven from the drive means at the box end 11 and the other shaft 15 is driven by its connection 29 with said one shaft 15. As will be seen from Fig. 3, the shaft ends lie substantially in engagement so that axial displacement of the shafts relative to the bearing bushing 29 is prevented, yet the clearance is sufficient to permit lifting the shafts out of the center bearing support. Each of the bearing halves (Fig. 3) extends laterally from the vertical plane of the support standard portion 25a (Figs. 2 and 3) a distance sufficient to receive quick detachable retaining spring rings 32, which will be described in detail below. Also, each bearing half has radially inwardly extending flanges 30 that embrace the associated journal section 29 (Fig. 3).

The complementary bearing part 28 comprises a generally hemicylindrical member that, as best shown in Fig. 3, extends axially like the section 26 a distance so as to conveniently receive the associated clamping spring member 32. The spring members are so constructed and arranged as to completely encircle the two associated pairs of bearing halves 26 and 28 as shown in Figs. 2 and 3. Thus, each spring member 32 effectively holds the associated two bearing halves together.

When it is desired to remove the upper or agitator shafts 15, as for cleaning out the hopper, the projecting ends 34 of the associated spring member 32 are engaged with a suitable tool and pressed toward one another which circumferentially expands the spring member 32 so as to make it possible to slip the spring 32 off the associated bearing parts, or to the right as viewed in Fig. 3, and then lift the bearing cap generally vertically off the lower bearing half 26, thus exposing the journal member 29 for the inner or adjacent ends of the agitator shafts 15. The inner or adjacent ends of the two shafts 15 are then raised slightly so that the associated journal member 29 can be slid past the flanges 30 on the upper center bearing half 26 so as to disconnect the two shafts 15, after which the shaft from which the journal member 29 has been shifted may be raised slightly and then shifted axially in the hopper until the drive end of the shaft is free from its connection 22 with the driving means. After this, both agitator shafts can then be lifted from the hopper. These relationships are illustrated diagrammatically in Fig. 6. The baffle 13 and the screen 14 are so constructed that they may be lifted out of the hopper after the upper or agitator shafts 15 have been taken out, and then the lower feed shafts 15 and associated structure may be removed from the hopper by substantially the same steps as just pointed out.

After cleaning has been completed the shafts may be readily replaced by a reverse of the above described steps. The spring tension in the members 32 serve to hold the bearing halves together.

While I have shown and described above the preferred structure in which the principles of the invention have been incorporated it is to be understood that my invention is not to be limited to the particular details, shown and described above, but that, in fact, widely different means may be employed in the practice of the broader aspects of my invention.

What I claim, therefore and desire to secure by Letters Patent is:

1. In a fertilizer distributor including an elongated material-containing hopper, a rotatable member removably disposed in said hopper and including a shaft, means at one end of said hopper to drive shaft, said means including a rotatable part having an axially inwardly facing socket into which one end of said shaft is adapted to be inserted by axially outward movement of the shaft, and a bearing for the other end of said shaft to removably receive the latter, said bearing comprising a generally vertical supporting part having at its upper end a lower bearing half extending generally axially from said supporting part and adapted to receive said other end of said shaft, an upper bearing half complementary with respect to said lower bearing half and adapted to embrace said other shaft end and to rest on said lower bearing half, and a spring retainer comprising a single length of spring wire bent into generally circular form and dimensioned circumferentially of said bearing to completely embrace both the axially extending portion of said lower bearing half and the associated portion of the upper bearing half so as to hold the bearing halves in assembled shaft-enclosing relation and yieldably biased to contract about said bearing halves, said spring wire having overlapping ends with upwardly extending projections spaced apart circumferentially, whereby by forcing said projections toward one another said bearing retainer spring is expandable circumferentially to provide for disconnection of the upper bearing half from the lower bearing half and the subsequent disconnection of the shaft and is removable from the hopper.

2. In a bearing construction, a bearing support member carrying at one end a first bearing part including a portion extending axially, a complementary bearing cap engaging said first bearing part, a spring member encircling both said part and said cap and constructed to exert a continual bias serving to releasably hold said part and cap together but yieldable circumferentially to accommodate axial removal of said spring member from said bearing part and cap and consequent removal of said cap from said bearing part, said spring member comprising a single length of spring wire bent into generally circular form and dimensioned to completely embrace both the axially extending first bearing part and the associated bearing cap, said spring wire having overlapping ends with upwardly extending projections spaced apart circumferentially, whereby by forcing said projections toward one another said bearing retainer spring is expandable circumferentially to provide for disconnection of the bearing cap from said first bearing part, an axially elongated bearing bushing normally carried between said first bearing part and said bearing cap and removable from said first part when said cap is removed, and a pair of axially aligned shafts having their adjacent ends received by said bearing bushing, and said bushing and one of said shafts being formed so that after said cap has been removed, the bushing may be shifted on said one shaft to a position freeing the other shaft, whereby the adjacent ends of both shafts may be lifted off said first bearing part.

3. The invention set forth in claim 2, further characterized by said bearing bushing having a non-rotatable connection with both of the associated adjacent shaft ends whereby driving one of said shafts acts through said bushing to also drive the other shaft.

References Cited in the file of this patent
UNITED STATES PATENTS

| | | |
|---|---|---|
| 1,226,603 | Sheldrup et al. | May 15, 1917 |
| 1,254,843 | Palser | Jan. 29, 1918 |
| 2,355,728 | Hyland | Aug. 15, 1944 |
| 2,778,535 | Seltzer | Jan. 22, 1957 |
| 2,801,030 | Beck | July 30, 1957 |